(12) United States Patent
Gauquelin et al.

(10) Patent No.: US 9,025,083 B2
(45) Date of Patent: May 5, 2015

(54) METHOD AND DEVICE FOR THE REAL-TIME SUPERPOSITION OF IMAGES ARISING FROM AT LEAST TWO VIDEO STREAMS

(75) Inventors: Xavier Gauquelin, Maison Alfort (FR); Hervé Picard, Juvisy sur Orge (FR); Jérôme Pilchen, Chatillon (FR)

(73) Assignee: MBDA France, Paris (FR)

(*) Notice: Subject to any disclaimer, the term of this patent is extended or adjusted under 35 U.S.C. 154(b) by 0 days.

(21) Appl. No.: 14/129,616

(22) PCT Filed: Jun. 25, 2012

(86) PCT No.: PCT/FR2012/000255
§ 371 (c)(1),
(2), (4) Date: Feb. 4, 2014

(87) PCT Pub. No.: WO2013/001176
PCT Pub. Date: Jan. 3, 2013

(65) Prior Publication Data
US 2014/0132840 A1 May 15, 2014

(30) Foreign Application Priority Data

Jun. 30, 2011 (FR) ...................................... 11 02049

(51) Int. Cl.
*H04N 9/76* (2006.01)
*H04N 9/74* (2006.01)
*G09G 5/00* (2006.01)

(52) U.S. Cl.
CPC ........................................ *H04N 9/76* (2013.01)

(58) Field of Classification Search
None
See application file for complete search history.

(56) References Cited

U.S. PATENT DOCUMENTS

| 7,205,997 | B1 * | 4/2007 | Williams et al. | 345/582 |
| 7,456,904 | B2 * | 11/2008 | Millar | 348/589 |
| 2003/0184553 | A1 * | 10/2003 | Dawson | 345/581 |
| 2003/0184556 | A1 * | 10/2003 | Hollis et al. | 345/582 |
| 2005/0110803 | A1 * | 5/2005 | Sugimura | 345/629 |
| 2009/0310023 | A1 * | 12/2009 | Nakayama | 348/584 |

* cited by examiner

*Primary Examiner* — Jefferey Harold
*Assistant Examiner* — Sean Haiem
(74) *Attorney, Agent, or Firm* — Duane Morris LLP; J. Rodman Steele, Jr.; Gregory M. Lefkowitz

(57) ABSTRACT

The device (1) comprises means (7) for assigning, for each pixel of a second image, a part of the three components (red, green, blue) defining the color constituting the pixel, to a component alpha containing an item of information relating to transparency and allowing management thereof, in such a way as to obtain a coded image, and means (2) comprising a digital electronic card (9) which is formed in such a way as to decode said coded image so as to extract the information relating to transparency, and to merge this image thus decoded with a first image, while taking account of said item of information relating to transparency, the image resulting from this merging being displayed by appropriate means (5).

15 Claims, 2 Drawing Sheets

METHOD AND DEVICE FOR THE REAL-TIME SUPERPOSITION OF IMAGES ARISING FROM AT LEAST TWO VIDEO STREAMS

CROSS-REFERENCE TO RELATED APPLICATIONS

This application is a §371 national stage entry of International Application No. PCT/FR2012/000255, filed Jun. 25, 2012, which claims priority to French Patent Application No. 1102049 filed Jun. 30, 2011, the entire contents of which are incorporated herein by reference.

The present invention relates to a method and a device for the real-time superposition of images coming from at least two video streams, with management of transparency between these images (for example, for augmented reality).

The real-time superposition of images from a plurality of video streams, as considered within the scope of the present invention, in particular can be used in a man-in-the-loop gunnery training simulator or in video games.

The superposition of images coming from a plurality of video streams is well known. By way of illustration, the broadcasting of weather forecasts on television can be cited, for example. A disadvantage of this superposition resides in the difficulty in managing transparency between the images to be superposed, whilst retaining realistic rendering of the colours and/or textures and processing latency (delay generated by the processing) that is not excessively high (namely, that is not visible to the naked eye).

The only solution that is currently known for attempting to overcome this problem is to carry out a video overlay using software, with the acquisition of two video streams and the generation of the resulting image.

However, this conventional technique has disadvantages. In effect, the video overlay, with transparency being managed by software, can cause significant latency when processing the image and thus a perceptible de-synchronisation between the individual displacements of the superposed video streams. Furthermore, when applied to a gunnery training simulator (man-in-the-loop), for example, the perception by the simulator user of these delays (greater than 120 ms) and/or the resulting shifts is prohibitive.

Software workarounds and optimisations designed to reduce these effects can be implemented, but they require specific dedicated hardware (graphics card), as well as considerable expertise in terms of the development and maintenance of the developed software components. Furthermore, the optimisation achieved then only makes it possible to be just below the threshold for perceiving latency, which makes any additional processing impossible, such as the aesthetic improvement of the rendering or an enhancement of the resolution, for example.

This conventional solution for managing transparency using software therefore is not satisfactory for the contemplated applications.

The object of the present invention is to overcome these disadvantages. It relates to a method for the real-time superposition of images coming from at least two video streams, particularly allowing transparency between the images to be managed, whilst retaining realistic rendering of the colours and/or textures and low processing latency.

To this end, according to the invention, said method, according to which the following series of successive operations is automatically and repeatedly carried out:
a) receiving a first image belonging to a first video stream;
b) receiving at least a second image belonging to at least a second video stream;
c) superposing said second image on said first image; and
d) displaying said superposition,
is noteworthy in that:
during step b), for each pixel of the second image, part of the three components (red, green, blue) defining the colour constituting the pixel is assigned to an alpha component containing information relating to transparency and allowing management of said transparency, so as to obtain a coded image; and
during step c), on a digital electronic card (9):
said coded image is decoded so as to extract the information relating to transparency; and
said image thus decoded and said first image are merged, taking into account said information relating to transparency (which has been extracted by the decoding process), with the image resulting from this merging being displayed during step d).

Of course, the preceding steps are repeatedly implemented in real time for the succession of images of said video streams.

Therefore, by virtue of the invention, it is possible to overlay images in real-time whilst taking into account transparency, and this can be carried out whilst considerably reducing latency. This reduction in latency allows delays and/or shifts between the images to be avoided that would be prohibitive for some applications. Furthermore, the margin that is thus obtained also allows additional processing to be carried out on the merged images, as described hereafter.

Advantageously, the alpha component that is used within the scope of the present invention is coded on six bits, that is $2^6$ levels of transparency. Furthermore:
in a first variant of an embodiment, which allows a visually acceptable image to be obtained, these (preferably six) bits of the alpha component are distributed on the three colours with the rest of the bits (preferably eighteen) uniformly distributed on the three colours; and
in a second variant of an embodiment, the bits of the alpha component are non-uniformly distributed on the three colours, favouring one colour in particular (for example, green, to which the human eye is more sensitive).

In a preferred embodiment, said digital electronic card is provided with a circuit of the FPGA (Field Programmable Gate Array) type.

Moreover, advantageously, said first video stream can be generated by a conventional video camera. Furthermore, in a particular embodiment, said second image is of the virtual type and can be generated (by conventional computer means) in advance so as to be synchronised on the first image during step c).

In particular, the present invention provides the following advantages:
optimisation of the processing latency (with maximum latency that remains below the threshold for perceiving the shift), particularly by virtue of hardware overlay processing, implemented by said digital electronic card with an FPGA unit. The acquired margin enables additional image processing to be contemplated, such as infrared filtering, outline extraction or aesthetic improvement, for example;
management of transparency between the different video streams, which allows, for example, the addition of smoke, a cloud, etc., particularly when superposing virtual images on an actual filmed landscape;
anticipation of the generation of the superposed stream (for virtual targets, for example when the movements of these targets are known); and independence in relation to the types of digital video streams (DVI, CameraLink, Gigavision, etc.) used.

In a particular embodiment, steps b) to d) are implemented for a plurality of second images, i.e. a plurality of second images (virtual) each illustrating one or more virtual targets (moving or non-moving), for example, is superposed on each (first) image of said first video stream (for example, a stream generated by a camera filming an actual scene).

The present invention further relates to a device for the automatic real-time superposition of images coming from at least two video streams.

According to the invention, said device of the type comprising:
  first means for receiving a first image belonging to a first video stream;
  second means for receiving at least a second image belonging to at least a second video stream;
  third means for superposing said second image on said first image; and
  fourth means for displaying said superposition;
is noteworthy in that it further comprises means for assigning, for each pixel of each second image, part of the three components (red, green, blue) defining the colour constituting the pixel to an alpha component containing information relating to transparency and allowing management of said transparency, so as to obtain a coded image, and in that said third means comprise a digital electronic card that is designed so as to decode said coded image so as to extract the information relating to transparency, and to merge said image thus decoded with said first image, taking into account said information relating to transparency, with the image resulting from this merging being displayed by said fourth means.

Advantageously, said device further comprises means for generating said first video stream, as well as means for generating said second video stream.

Furthermore, in a particular embodiment, said second means are designed so as to receive at least two second images, and said third means are designed so as to superpose, upon each iteration, said (at least two) second images on said first image.

The present invention also relates to:
  a gunnery simulator; and/or
  a video game,
that comprise a device as previously described.

Numerous other applications of the invention also can be contemplated. The following can be cited in particular by way of non-limiting example:
  augmented reality;
  operating assistance in the medical field; and
  automobile design assistance.

The figures in the appended drawings will demonstrate how the invention can be realised. In these figures, identical reference numerals designate similar elements.

Figure 3A:
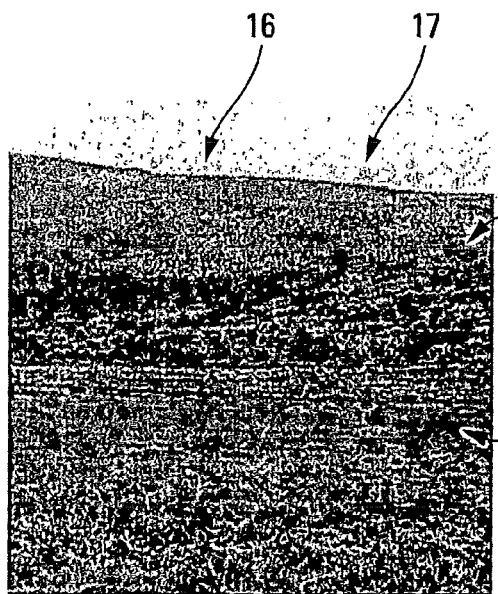
Figure 3B:
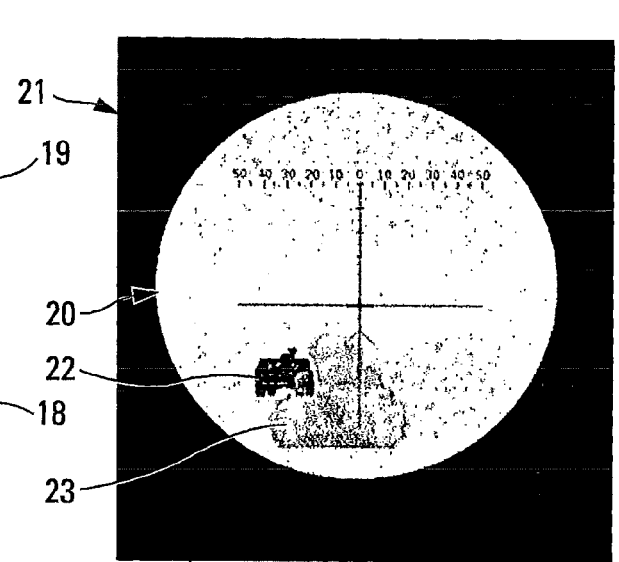
Figure 3C:
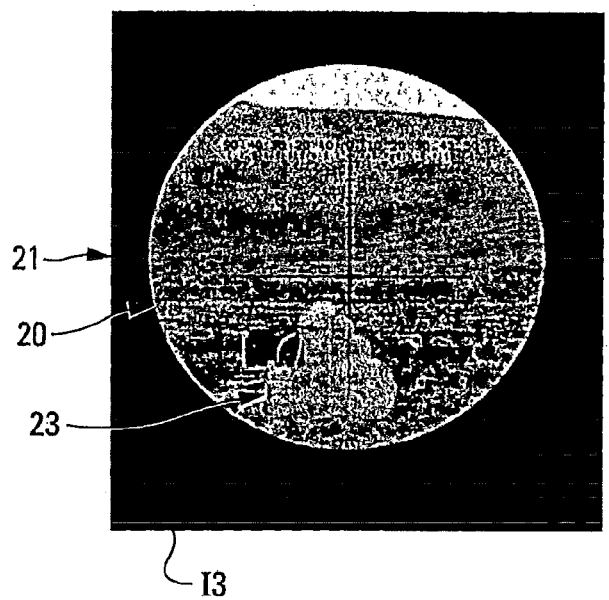

FIGS. 3A, 3B and 3C respectively illustrate an image coming from a first video stream, an image coming from a second video stream and the resulting image, which is generated and displayed by the device according to the present invention.

Figure 1:
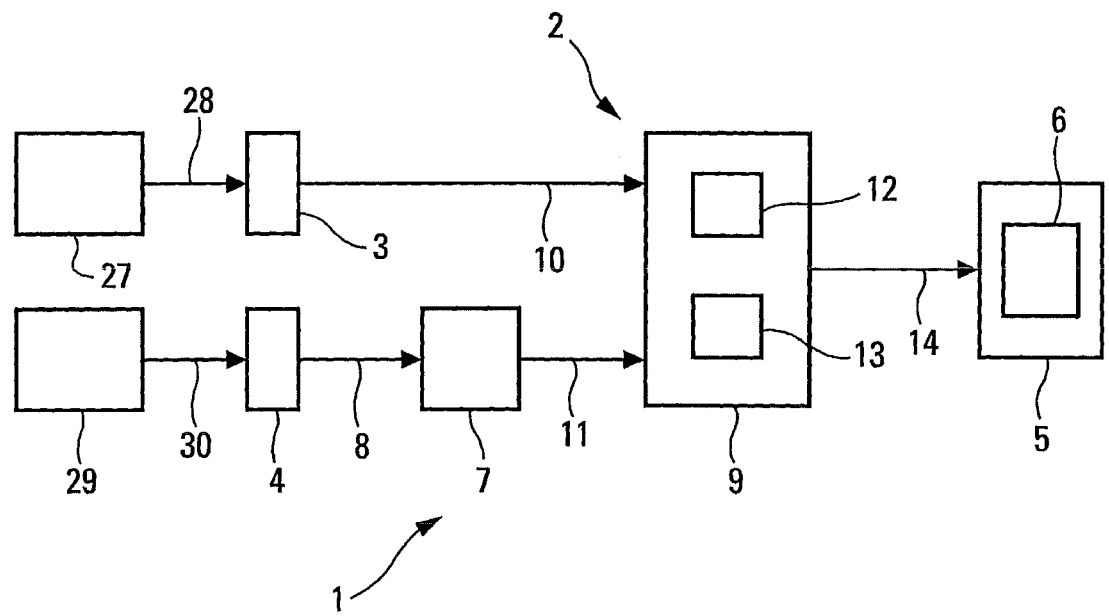
FIG. 1 is a block diagram of a device according to the present invention.

The device 1, according to the invention and schematically shown in FIG. 1, is designed to carry out the real-time superposition of images coming from at least two video streams, with management of transparency between these images (for example, for augmented reality). It is known that a video stream is composed of a succession of images that are repeatedly generated in sufficient numbers (for example, twenty five per second) to create an illusion of movement for a human eye, to which this succession of images is shown.

In order to achieve this, said device 1 is of the type comprising:
  conventional means 3 for repeatedly acquiring first video images belonging to a first video stream;
  conventional means 4 for repeatedly acquiring second video images belonging to a second video stream;
  means 2 for repeatedly superposing each second image on the first image corresponding to the same sampling instant; and
  means 5 for repeatedly displaying in real-time the stream of images that results from this superposition on at least a conventional display screen 6 so as to generate a restitution of animated images.

According to the invention, said device 1 further comprises means 7 for assigning, by software processing and for each pixel of each second image (received via a link 8 from said means 4), part of the three components (red, green, blue) defining the colour constituting the pixel to an alpha component (also received from the means 4) containing information relating to transparency and allowing management of said transparency, so as to obtain a coded image at the output of the means 7.

Moreover, according to the invention, said means 2 comprise a digital electronic card 9 provided with a programmable integrated circuit of the FPGA (Field Programmable Gate Array) type. This digital electronic card 9 is connected by means of links 10 and 11 to said means 3 and 7, respectively, and comprises:
  on the one hand, means 12 designed to decode the coded image (received via the link 11) so as to extract the information relating to transparency; and
  on the other hand, means 13 designed to merge the image thus decoded (by the means 12) and said first image (received from the means 3), taking into account said information relating to transparency (which has been extracted by the means 12).

The image that results from this merging is then transmitted via a link 14 to said means 5 that display the image on the display screen 6.

Therefore, the device 1 according to the invention is capable of overlaying images, automatically and in real-time, taking into account transparency, and whilst considerably reducing latency. The margin that is thus obtained allows additional processing to be carried out on the merged images, as described hereafter. This device 1 in particular can be applied to a man-in-the-loop gunnery training simulator or to video games.

The solution according to the invention therefore consists of taking into account transparency via two-stage processing, comprising:
A/firstly, software processing (means 7);
B/then hardware processing (dedicated card 9 with an FPGA management unit).

It is known that, conventionally, each pixel of an image is managed by the three primary colours (red, green, blue (RGB)) on 8 bits each. This RGB coding consists of representing the space of the colours on the basis of these three components, with the intensities of each of these colours being coded on one byte (8 bits). An alpha layer is also known that allows information to be provided relating to the management of transparency.

According to the invention, in order to be able to take into account and transmit information relating to transparency, the totality of the three bytes of a pixel is not used for information relating to the RGB colours. However, for each pixel of a second image (received by a link 8 from said means 3), part of the bits of these three colours (red, green, blue) is assigned to transparency information relating to an alpha layer.

Furthermore:
- in a first preferred variant of an embodiment, the bits of the alpha layer are uniformly distributed on the three colours; and
- in a second variant of an embodiment, said bits of the alpha layer are non-uniformly distributed on the three colours, favouring one colour (green in particular), for example.

The aim is to obtain a visually acceptable image. The best compromise is obtained when all of the R, G and B components and the alpha component are each coded on six bits, as shown on line L1 of FIG. 2. In this case, the six bits of the alpha component (highlighted by the dashed lines) are uniformly distributed (in pairs) on each of the six bits (shown by the continuous lines) of each colour component so as to obtain the bytes R1, V1 and B1 shown on line L2 of this FIG. 2. The information that is thus encoded (which therefore comprises data relating to transparency) can be transmitted by a bus (link 11), which on its own is not capable of transmitting an alpha layer.

Figure 2:
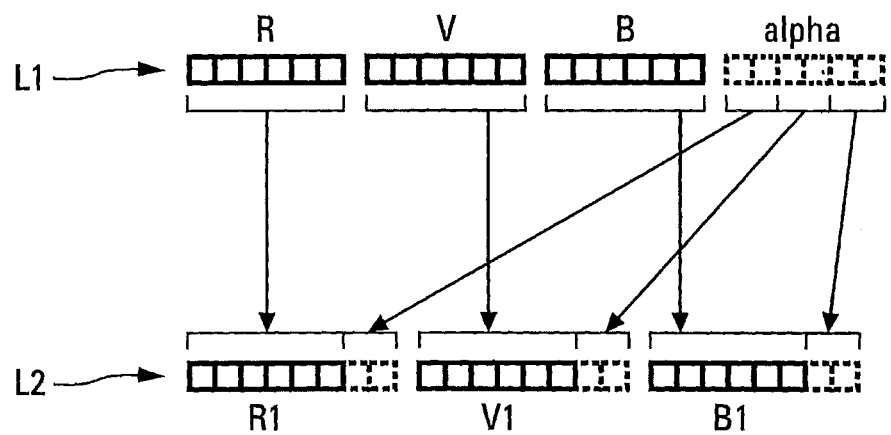
FIG. 2 is a schematic illustration allowing the reservation of pixels to be explained as implemented within the scope of the present invention.

Moreover, with regard to the hardware processing implemented by the card 9:
- the means 12 decode, for each pixel of an image received via the link 11, the new combination generated by the means 7, for example as shown on line L2 of FIG. 2, in order to separate the information relating to transparency from the information relating to colours; and
- the means 13 merge the two images, namely the decoded image (by the means 12) and said first image (received from the means 3), taking into account said information relating to transparency for managing transparency on the resulting merged image, which finally will be displayed.

One of the main advantages that is obtained by virtue of the present invention is shown in FIG. 3C.

FIGS. 3A, 3B and 3C respectively illustrate:
- an image I1 coming from a first video stream, which is received by the means 3, in this case an actual scene 16 filmed by a camera. This actual scene 16 represents a landscape 17 comprising flat terrain 18 in the foreground and a small hill 19 in the background;
- an image I2 coming from a second video stream, which is received by the means 4, in this case a virtual image conventionally created by computer means. This virtual image comprises a field of vision 20 in the form of a circle, surrounded by a black background 21. This field of vision 20 can represent the part in the space that is seen by a serviceman through a sight on a weapons system, for example an anti-tank missile launcher. This field of vision 20 contains a tank 22, as well as a cloud of smoke 23; and
- the resulting image I3, which is generated and displayed by the device 1 according to the present invention.

This image I3 clearly shows that the transparency of the cloud of smoke 24 has been taken into account according to the present invention.

Therefore, the present invention allows transparency to be managed, which in particular is unlike a conventional overlay of two images, of the hardware type, as produced by the "Chromakey" method (image overlay on an even colour background), for which the image is viewed on two layers and the values of the three RGB bytes of the pixel of the upper image are simply replaced by those of the image below if they represent an even colour dedicated to this method.

The present invention particularly allows the following advantages to be obtained:
- optimisation of the processing latency (with maximum latency that remains below the threshold for perceiving a shift), particularly by virtue of the hardware overlay processing (means 9). The margin that is acquired allows additional image processing to be contemplated, such as infrared filtering or outline extraction, for example;
- anticipation of the generation of the video (for example, virtual targets) when the target movements are known;
- management of transparency between the different video streams, which allows, for example, the addition of smoke 23, a cloud, etc., when superposing virtual images on an actual filmed landscape; and
- independence in relation to the types of digital video streams (DVI, CameraLink, Gigavision, etc.) used.

Furthermore, said device 1 can also comprise:
- means 27, in particular a conventional camera that films an actual scene showing, for example, a landscape or a battlefield, for generating said first video stream that is transmitted to the means 3 (via a link 28); and
- means 29, in particular computer means for creating virtual images, for generating said second video stream that is transmitted to the means 4 (via a link 30).

Furthermore, in a particular embodiment (not shown), said means 4 are designed so as to receive at least two second images, and said means 9 are designed so as to superpose said second images on said first image. Therefore, in this particular embodiment, the invention is implemented for a plurality of second images, i.e. a plurality of second images each illustrating, for example, a virtual target (moving or non-moving) is superposed on each (first) image of the first video stream (for example, a real stream generated by a camera).

The invention claimed is:

1. Method for the real-time superposition of images coming from at least two video streams, according to which the following series of successive operations is automatically and repeatedly carried out:
  a) receiving a first image (I1) belonging to a first video stream;
  b) receiving at least two second images (I2) belonging to at least a second video stream;
  c) superposing, upon each iteration on said first image (I1), said at least two second images (I2) of the at least a second video stream; and
  d) displaying said superposition,
said method further comprising:
  during step b), assigning, for each pixel of the at least two second images (I2), part of the three components defining the colour constituting the pixel to an alpha component containing information relating to transparency and allowing management of said transparency, so as to obtain a coded image;
  during step c), on a digital electronic card (9):
  decoding said coded image so as to extract the information relating to transparency; and
  merging said image thus decoded and said first image (I1), taking into account said information relating to transparency, with the image (I3) resulting from this merging being displayed during step d); and
  said at least two second images (I2) are generated in advance and are synchronised on said first image (I1) during step c), wherein said at least two second images are related to said first image to form a single scene when said at least two second images are superpositioned on said first image.

2. Method according to claim 1, wherein during step b) an alpha component is used that is coded on six bits.

3. Method according to claim 1, wherein the bits of the alpha component are distributed on the three colour components constituting the pixel.

4. Method according to claim 1, wherein the bits of the alpha component are non-uniformly distributed on the three colour components constituting the pixel.

5. Method according to claim 1, wherein said digital electronic card (9) is provided with a circuit of the FPGA type.

6. Method according to claim 1, wherein said at least two second images (I2) are of the virtual type.

7. Method according claim 1, wherein said first video stream is generated by a video camera.

8. Method according to claim 1, wherein said at least two second images respectively belong to at least two second video streams.

9. Method according to claim 1, wherein during step c) additional processing is carried out on the merged image.

10. Device for the real-time superposition of images coming from at least two video streams, said device (1) comprising:
    first means (3) for receiving a first image (I1) belonging to a first video stream;
    second means (4) for receiving at least two second images (I2), which belongs to at least a second video stream and is generated in advance;
    third means (2) for superposing, upon each iteration on said first image (I1), said at least two second images (I2) of the at least a second video stream, by synchronising said at least two second images on said first image (I1);
    fourth means (5) for displaying said superposition; and
    means (7) for assigning, for each pixel of each said at least two second images (I2), part of the three components defining the colour constituting the pixel to an alpha component containing information relating to transparency and allowing management of said transparency, so as to obtain a coded image,
    with said third means (2) comprising a digital electronic card (9) that is designed so as to decode said coded image so as to extract the information relating to transparency and to merge said image thus decoded and said first image (I1), taking into account said information relating to transparency, with the image (I3) resulting from this merging being displayed by said fourth means (5), wherein said at least two second images are related to said first image to form a single scene when said at least two second images are superpositioned on said first image.

11. Device according to claim 10, wherein it further comprises means (27) for generating said first video stream and means (29) for generating said second video stream.

12. Device according to claim 10, wherein said at least two second images each belong to a second corresponding video stream.

13. Gunnery simulator, comprising a device (1) for the real-time superposition of images, such as the device which has been specified according to claim 10.

14. The method according to claim 1, wherein the superposition video of step d) is an interactive video stream used in a field selected from the group consisting of a gunnery simulator, virtual reality, operating assistance in medicine, and automotive design assistance.

15. The method according to claim 1, wherein the at least two second images are each selected from the group consisting of a cloud, a tank, smoke, and a field of view through the sight on a weapon.

* * * * *